United States Patent
Seo et al.

(10) Patent No.: US 8,942,101 B2
(45) Date of Patent: Jan. 27, 2015

(54) METHOD FOR RELAYING DATA PERFORMED BY A RELAY STATION IN WIRELESS COMMUNICATION SYSTEM BASED ON TDD

(75) Inventors: Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 13/142,847

(22) PCT Filed: Jan. 5, 2010

(86) PCT No.: PCT/KR2010/000034
§ 371 (c)(1),
(2), (4) Date: Jun. 29, 2011

(87) PCT Pub. No.: WO2010/077120
PCT Pub. Date: Jul. 8, 2010

(65) Prior Publication Data
US 2011/0267992 A1 Nov. 3, 2011

Related U.S. Application Data

(60) Provisional application No. 61/142,383, filed on Jan. 5, 2009.

(30) Foreign Application Priority Data

Mar. 4, 2009 (KR) .................. 10-2009-0018618

(51) Int. Cl.
*H04L 1/00* (2006.01)
*H04B 7/26* (2006.01)
*H04B 7/155* (2006.01)
*H04L 12/801* (2013.01)
*H04B 7/14* (2006.01)

(52) U.S. Cl.
CPC .......... *H04B 7/2606* (2013.01); *H04B 7/15542* (2013.01); *H04L 47/10* (2013.01); *H04B 7/14* (2013.01)
USPC ............ 370/236; 370/249; 370/315; 370/329

(58) Field of Classification Search
CPC .......... H04B 7/2606; H04B 7/15; H04B 7/14; H04B 7/15542; H04L 47/10; H04L 2001/0097; H04L 5/0055; H04L 5/0053; H04L 1/0001; H04L 1/0027
USPC ......... 370/274, 280, 294, 315, 321, 329, 338, 370/348, 492, 501, 336, 230, 231, 236, 370/236.2, 249
See application file for complete search history.

(56) References Cited

U.S. PATENT DOCUMENTS

| | | | |
|---|---|---|---|
| 2008/0219229 A1* | 9/2008 | Zheng | 370/338 |
| 2008/0240002 A1 | 10/2008 | Li | |
| 2009/0092103 A1* | 4/2009 | Rao | 370/336 |
| 2010/0080166 A1* | 4/2010 | Palanki et al. | 370/315 |

FOREIGN PATENT DOCUMENTS

| | | | |
|---|---|---|---|
| KR | 1020080063927 | | 7/2008 |
| WO | WO 2010070385 | * | 6/2010 |

OTHER PUBLICATIONS

Li et al., "IEEE 802.16m TDD frame structure with legacy support," IEEE 802.16 Broadband Wireless Access Working Group, IEEE C802.16m-07/215r1, Jan. 2008.

* cited by examiner

*Primary Examiner* — Kwang B Yao
*Assistant Examiner* — Harun Chowdhury
(74) *Attorney, Agent, or Firm* — Lee, Hong, Degerman, Kang & Waimey (57) ABSTRACT

A method of relaying data performed by a relay station in a wireless communication system based on time division duplex (TDD) is provided. The relay station receives downlink data from a base station and relays the downlink data to at least one mobile station in an uplink subframe which belongs to an unlinked subframe. Accordingly, uplink acknowledgement (ACK) collision can be avoided, and efficiency of resource allocation can be increased.

4 Claims, 7 Drawing Sheets

METHOD FOR RELAYING DATA PERFORMED BY A RELAY STATION IN WIRELESS COMMUNICATION SYSTEM BASED ON TDD

CROSS-REFERENCE TO RELATED APPLICATIONS

This application is the National Stage filing under 35 U.S.C. 371 of International Application No. PCT/KR2010/000034, filed on Jan. 5, 2010, which claims the benefit of earlier filing date and right of priority to Korean Patent Application No. 10-2009-0018618, filed on Mar. 4, 2009, and also claims the benefit of U.S. Provisional Application Ser. No. 61/142,383, filed on Jan. 5, 2009, the contents of which are all hereby incorporated by reference herein in their entirety.

TECHNICAL FIELD

The present invention relates to wireless communications, and more particularly, to a method of relaying data by a relay station in a time division duplex (TDD)-based wireless communication system.

BACKGROUND ART

A wireless communication system can be briefly classified into a system based on a frequency division duplex (FDD) scheme and a system based on a time division duplex (TDD) scheme. In the FDD scheme, uplink transmission and downlink transmission are achieved by occupying two different frequency bands. In the TDD scheme, uplink transmission and downlink transmission are achieved at different times while occupying the same frequency band. A channel response based on the TDD scheme is reciprocal in practice. This implies that a downlink channel response is almost identical to an uplink channel response in a given frequency domain. Therefore, in a TDD-based wireless communication system, the downlink channel response can be advantageously obtained from the uplink channel response.

In the TDD scheme, a full frequency band is time-divided into uplink transmission and downlink transmission, and thus downlink transmission performed by a base station (BS) and uplink transmission performed by a mobile station (MS) cannot be simultaneously achieved. In a TDD system in which uplink transmission and downlink transmission are divided on a subframe basis, uplink transmission and downlink transmission are performed in different subframes.

A wireless communication system employing a relay station (RS) has recently been developed. The RS is employed for cell coverage extension and transmission capability improvement. A BS provides a service to an MS located in a coverage boundary of the BS via the RS, and thus can obtain an effect of extending the cell coverage. In addition, the RS improves signal transmission reliability between the BS and the MS, thereby improving transmission capacity. The RS may be used when the MS is located within the coverage of the BS and is also located in a shadow area.

It is difficult for the RS to receive data from the BS while simultaneously transmitting data to the MS, and on the contrary, it is difficult for the RS to receive data from the MS while simultaneously transmitting data to the BS. This is because a signal output from a transmitting end of the RS may act as interference to a signal to be received by the RS due to self-interference, and as a result, the signal may be distorted.

Since the RS cannot simultaneously perform data reception from the BS and data transmission to the MS (or data transmission to the BS and data reception from the MS), the TDD system may have low efficiency of resource allocation.

Accordingly, there is a need for a method capable of effectively relaying data by an RS in a TDD-based wireless communication system.

DISCLOSURE OF INVENTION

Technical Problem

The present invention provides a method of relaying data performed by a relay station in a time division duplex (TDD)-based wireless communication system.

Solution to Problem

According to an aspect of the present invention, a method of relaying data in a wireless communication system based on TDD using a radio frame consisting of a plurality of downlink subframes and a plurality of uplink subframes is provided. The method includes receiving downlink data from a base station, and relaying the downlink data to at least one mobile station, wherein the plurality of uplink subframes are divided into a linked uplink subframe which is reserved to transmit acknowledgement (ACK)/non-acknowledgement (NACK) for downlink data transmitted in at least one downlink subframe and an unlinked uplink subframe which is not linked to the downlink subframe, and wherein a relay subframe used to receive the downlink data or to transmit data to the base station belongs to the unlinked uplink subframe.

The radio frame may have a configuration of a $3^{rd}$ generation partnership project (3GPP) long term evolution (LTE) TDD system or may have a new configuration. The unlinked uplink subframe may be a subframe 3 or 8 in a configuration 0 of the TDD system.

According to another aspect of the present invention, a method of relaying data in a wireless communication system based on TDD using a radio frame consisting of a plurality of downlink subframes and a plurality of uplink subframes is provided. The method includes receiving downlink data from a base station, and relaying the downlink data to at least one mobile station, wherein the plurality of uplink subframes are divided into a linked uplink subframe which is reserved to transmit ACK/NACK for downlink data transmitted in at least one downlink subframe and an unlinked uplink subframe which is not linked to the downlink subframe, and wherein a relay subframe used to receive the downlink data or to transmit data to the base station is the unlinked uplink subframe or is selected from the linked subframes by assigning priority in an ascending order according to the number of downlink subframes linked to the linked uplink subframes.

Advantageous Effects of Invention

According to the present invention, a wireless communication system based on time division duplex (TDD) in which uplink transmission and downlink transmission are achieved on a subframe basis can relay data without additional resource allocation for a relay station. Therefore, uplink acknowledgement (ACK) collision can be avoided, and efficiency of resource allocation can be increased. In addition, the present invention proposes resource allocation for an operation of the relay station in the TDD-based wireless communication system.

MODE FOR THE INVENTION

Wideband CDMA (WCDMA) can be implemented with a wireless technique such as a universal terrestrial radio access network (UTRAN) defined by the 3$^{rd}$ generation partnership project (3GPP) standardization organization. CDMA2000 is a wireless technique based on code division multiple access (CDMA). High rate packet data (HRPD) defined by the 3$^{rd}$ generation partnership project 2 (3GPP2) provides a high-rate packet data service in a CDMA2000-based system. Evolved HRPD is an evolution of the HRPD. Time division multiple access (TDMA) can be implemented with a wireless technique such as global system for mobile communications (GSM)/general packet radio service (GPRS)/enhanced data rates for GSM evolution (EDGE). Orthogonal frequency division multiple access (OFDMA) can be implemented with a wireless technique such as IEEE 802.11 (Wi-Fi), IEEE 802.16 (WiMAX), IEEE 802-20, E-UTRAN (Evolved-UTRAN), etc. Long term evolution (LTE) is a part of an evolved-universal mobile telecommunications system (E-UMTS) using an evolved-universal terrestrial radio access network (E-UTRAN). The LTE employs the OFDMA in a downlink and employs single carrier-frequency division multiplex access (SC-FDMA) in an uplink. LTE-advance (LTE-A) is an evolution of the LTE.

For clarity, the following description will focus on the 3GPP LTE/LTE-A. However, technical features of the present invention are not limited thereto.

Figure 1:
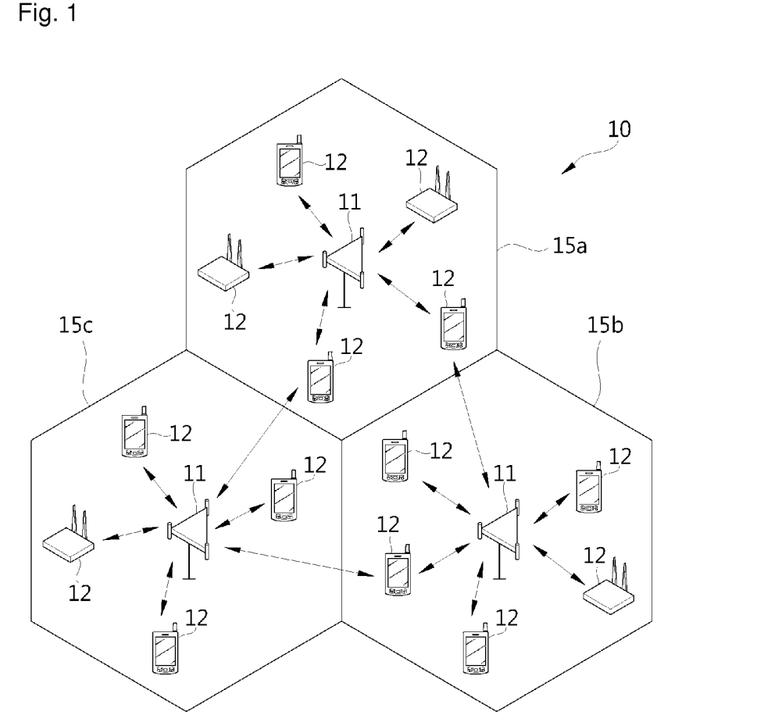
FIG. 1 shows a wireless communication system.

FIG. 1 shows a wireless communication system. Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). One or more cells may exist in the coverage of one BS.

A mobile station (MS) 12 may be fixed or mobile, and may be referred to as another terminology, such as a user equipment (UE), a user terminal (UT), a subscriber station (SS), a wireless device, a personal digital assistant (PDA), a wireless modem, a handheld device, an access terminal (AT), etc. The BS 11 is generally a fixed station that communicates with the MS 12 and may be referred to as another terminology, such as an evolved node-B (eNB), a base transceiver system (BTS), an access point, an access network (AN), etc.

Hereinafter, a downlink (DL) implies communication from the BS to the MS, and an uplink (UL) implies communication from the MS to the BS. In the DL, a transmitter may be a part of the BS, and a receiver may be a part of the MS. In the UL, the transmitter may be a part of the MS, and the receiver may be a part of the BS.

Figure 2:
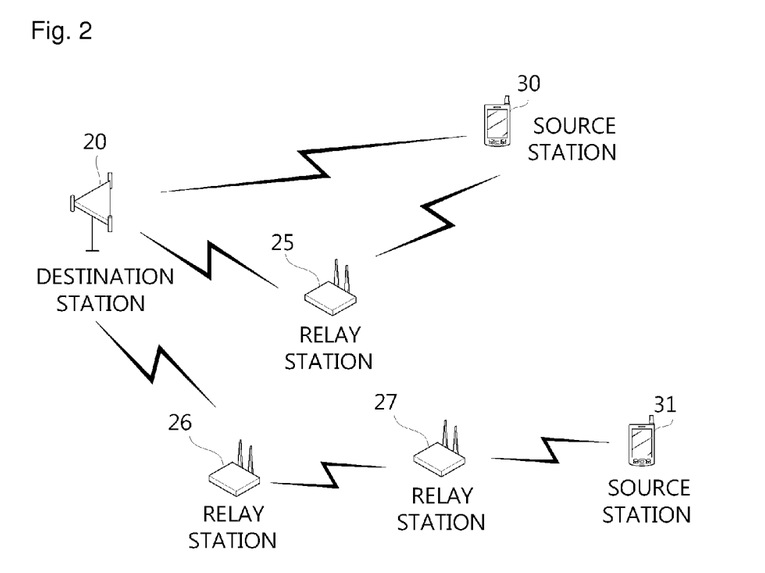
FIG. 2 shows a wireless communication system employing a relay station.

FIG. 2 shows a wireless communication system employing a relay station (RS). In UL transmission, a source station may be an MS, and a destination stations may be a BS. In DL transmission, a source stations may be the BS, and a destination stations may be the MS. The RS may be the MS, or may be provided as a separate RS. The BS may perform functions such as connectivity, management, control, and resource allocation between the RS and the MS.

Referring to FIG. 2, a destination station 20 communicates with a source station 30 via an RS 25. In UL transmission, the source station 30 transmits UL data to the destination station 20 and the RS 25, and the RS 20 retransmits the received data. The destination station 20 also communicates with a source station 31 via RSs 26 and 27. In UL transmission, the source station 31 transmits UL data to the destination station 20 and the RSs 26 and 27, and the RSs 26 and 27 retransmit the received data simultaneously or in sequence.

Although one destination station 20, three RSs 25, 26, and 27, and two source stations 30 and 41 are shown herein, the present invention is not limited thereto. The number of destination stations, relay stations, and source stations included in the wireless communication system is not limited to any particular number.

A relay scheme used in the RS may be either amplify and forward (AF) or decode and forward (DF), and the technical features of the present invention are not limited thereto.

Figure 3:
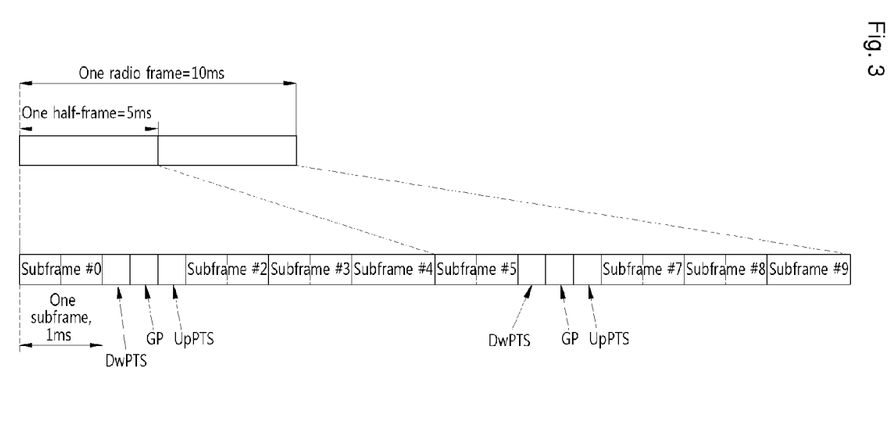
FIG. 3 shows a structure of a time division duplex (TDD) radio frame in a 3$^{rd}$ generation partnership project (3GPP) long term evolution (LTE) system.

FIG. 3 shows a structure of a TDD radio frame in a 3GPP LTE system. Section 4.2 of the 3GPP TS 36.211 V8.2.0 (2008-03) "Technical Specification Group Radio Access Network; Evolved Universal Terrestrial Radio Access (E-UTRA); Physical Channels and Modulation (Release 8)" may be incorporated herein by reference. One radio frame has a length of 10 milliseconds (ms) and consists of two half-frames each having a length of 5 ms. One half-frame consists of five subframes each having a length of 1 ms. Each subframe is designated as any one of a UL subframe, a DL subframe, and a special subframe. One radio frame includes at least one UL subframe and at least one DL subframe.

The special subframe is a specific period positioned between the UL subframe and the DL subframe for the purpose of UL-DL separation. One radio frame includes at leas one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization of an MS. The GP is positioned between the UL time slot and the DL time slot and is used to remove interference that occurs in UL transmission due to a multi-path delay of a DL signal.

Table 1 shows a structure of a configurable radio frame according to arrangement of UL subframes and DL subframes in a 3GPP LTE TDD system. In configurations 0, 1, 2, and 6, UL-DL switching is performed with a switching point period of 5 ms. In configurations 3, 4, and 5, UL-DL switching is performed with a switching point period of 10 ms. In Table 1, 'D' denotes a DL subframe, 'U' denotes a UL subframe, and 'S' denotes a special subframe.

TABLE 1

| UL-DL Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Meanwhile, when the BS transmits data in a DL subframe, the MS transmits an acknowledgement (ACK)/non-acknowledgement (NACK) signal for corresponding DL data in a UL subframe after a specific time elapses. In this case, it is called that the UL subframe and the DL subframe are linked or associated.

If the number of DL subframes is greater than the number of UL subframes, an amount of resources capable of transmitting the ACK/NACK signal is limited. That is, when N packets are received by the MS in multiple DL subframes, there may be a case where the ACK/NACK signal has to be transmitted by using ACK/NACK resources whose number is smaller than N.

In Table 1 above, if it is assumed that subframes indicated by 'S' are all DL subframes, in the configuration 2, one radio frame includes 8 DL subframes and 2 UL subframes. That is, a ratio of the number of DL subframes to the number of UL subframes is 4:1. In this case, the MS receives data by using 4 DL subframes, and transmits the ACK/NACK signal by using 1 UL subframe. As such, if the number of DL subframes is greater than the number of UL subframes, it is difficult to map the data and the ACK/NACK signal in a 1:1 manner. Therefore, N:1 mapping is necessary between the data and the ACK/NACK, which is referred to as ACK/NACK bundling. That is, a single ACK/NACK signal is used as a hybrid ARQ (HARQ) feedback for multiple DL data transmissions.

Figure 4:
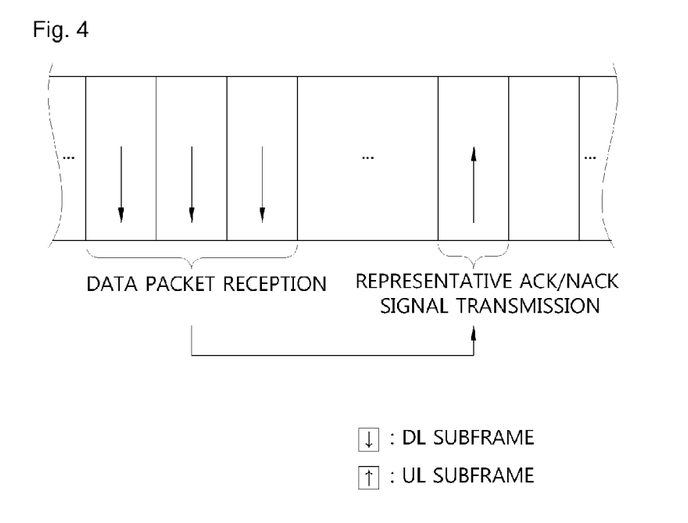
FIG. 4 shows a method of performing hybrid automatic repeat request (HARM) by using acknowledgement (ACK)/non-acknowledgement (NACK) bundling.

FIG. 4 shows a method of performing HARQ by using ACK/NACK bundling. An MS transmits one ACK/NACK signal in one UL subframe, and the ACK/NACK signal corresponds to data received in 3 contiguous DL subframes. That is, a ratio of the number of subframes occupied by the data to the number of subframes occupied by the ACK/NACK signal is 3:1. When a plurality of subframes are allocated as DL subframes to a specific MS of a TDD system, the ACK/NACK signal is transmitted by regarding data transmitted in the DL subframes as one HARQ packet.

Table 2 shows an index of a UL subframe in which ACK/NACK is transmitted for corresponding DL data by the MS, with respect to each configuration of Table 1 above. Section 10.2 of the 3GPP TS 36.213 V8.3.0 (2008-05) "Technical Specification Group Radio Access Network; Evolved Universal Terrestrial Radio Access (E-UTRA); Physical layer procedures (Release 8)" may be incorporated herein by reference. In Table 2, '-' indicates that a subframe is configured as a UL subframe, and a numerical symbol indicates a subframe number of a linked UL subframe in a corresponding DL subframe. For example, in a configuration 0, ACK/NACK for DL data transmitted in a subframe 0 is transmitted in a subframe 4 which is a UL subframe. In addition, in a configuration 1, ACK/NACK for DL data transmitted in subframes 0 and 1 which are DL subframes is transmitted in a subframe 7 which is a UL subframe.

Hereinafter, a UL subframe which is reserved to transmit ACK/NACK for DL data transmitted in at least one DL subframe is referred to as a linked UL subframe, and a UL subframe which is not linked to a DL subframe is referred to as an unlinked UL subframe.

TABLE 2

| UL-DL Configuration | subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

When a radio communication system employs an RS, there is a need to define a subframe for receiving data transmitted from a BS. The RS can receive data transmitted from the BS by using a DL subframe or a UL subframe.

When the RS receives data transmitted from the BS by using the DL subframe, data cannot be transmitted to an MS in that DL subframe. In this case, the RS cannot transmit an important control signal or the like, and thus system efficiency may deteriorate.

When the RS receives data transmitted from the BS by using the UL subframe, DL transmission of the RS is not affected at all. Therefore, the RS can be more effectively operated. A UL subframe used for data transmission between the BS and the RS is referred to as a relay subframe.

However, in order to transmit a signal to the BS or the RS while simultaneously receiving a signal from the MS by the RS or the BS in a UL subframe, the use of expensive devices may be necessary. Therefore, in reality, data transmitted by the MS cannot be received while simultaneously transmitting data by the RS or the BS in the UL subframe.

This may result in UL ACK collision. The UL ACK collision implies a case where the BS or the RS transmits a signal in a UL subframe and thus cannot receive ACK/NACK transmitted by the MS. At the occurrence of the UL ACK collision, the BS or the RS cannot confirm success or failure of reception of the MS, which may result in unnecessary retransmission. This may cause waste of radio resources.

Figure 5:
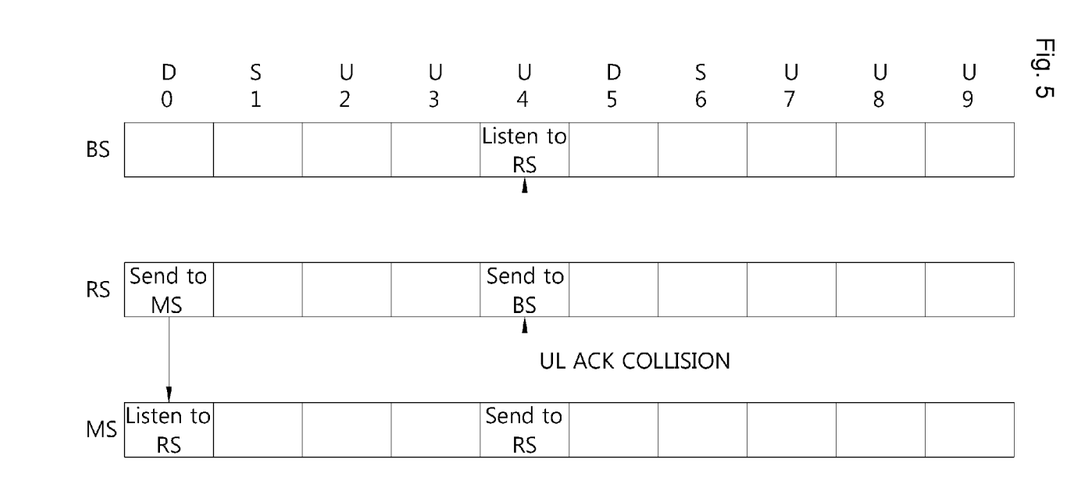
FIG. 5 shows occurrence of uplink ACK collision in a configuration 0.

FIG. 5 shows occurrence of UL ACK collision in the configuration 0 of Table 1 above. An MS receives DL data in a subframe 0, and an RS transmits data to a BS in a subframe 4 which is a UL subframe. Meanwhile, referring to Table 2 above, ACK/NACK for DL data received in the subframe 0 is reserved to be transmitted in the subframe 4. Therefore, when the MS transmits ACK/NACK in the subframe 4, the RS cannot receive the ACK/NACK, resulting in the occurrence of the UL ACK collision.

Figure 6:
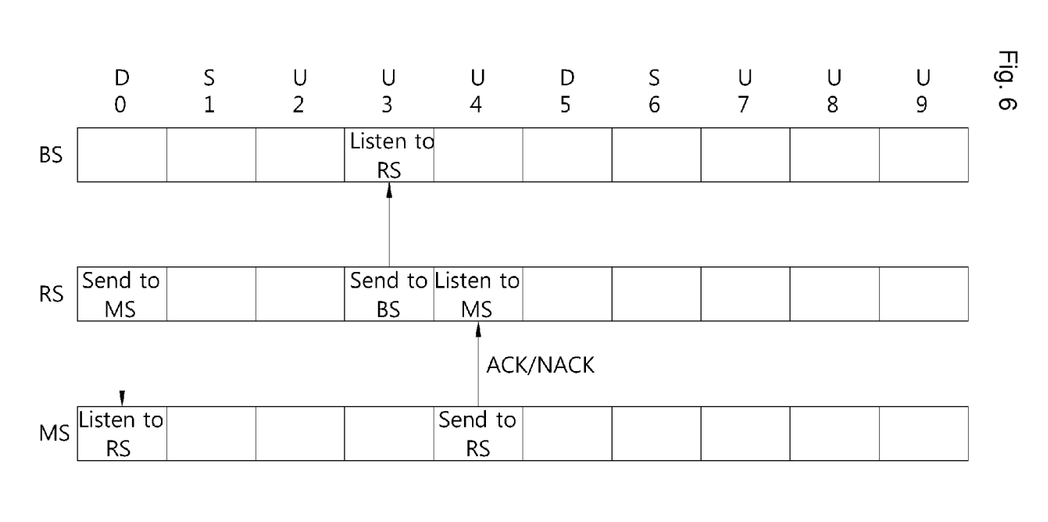
FIG. 6 shows a mechanism of transmitting data by using an unlinked uplink subframe according to an embodiment of the present invention.

FIG. 6 shows a mechanism of transmitting data by using an unlinked UL subframe according to an embodiment of the present invention. In FIG. 6, an RS transmits data to a BS by using a UL subframe 3 of the configuration 0. According to Table 2 above, all UL subframes other than subframes 3 and 8 of the configuration 0 correspond to linked UL subframes. That is, when data is transmitted by using the remaining UL subframes other than the two UL subframes, UL ACK collision may occur. Therefore, when data is transmitted by using the subframes 3 and 8 (i.e., unlinked UL subframes) of the configuration 0, the UL ACK collision can be avoided.

Figure 7:
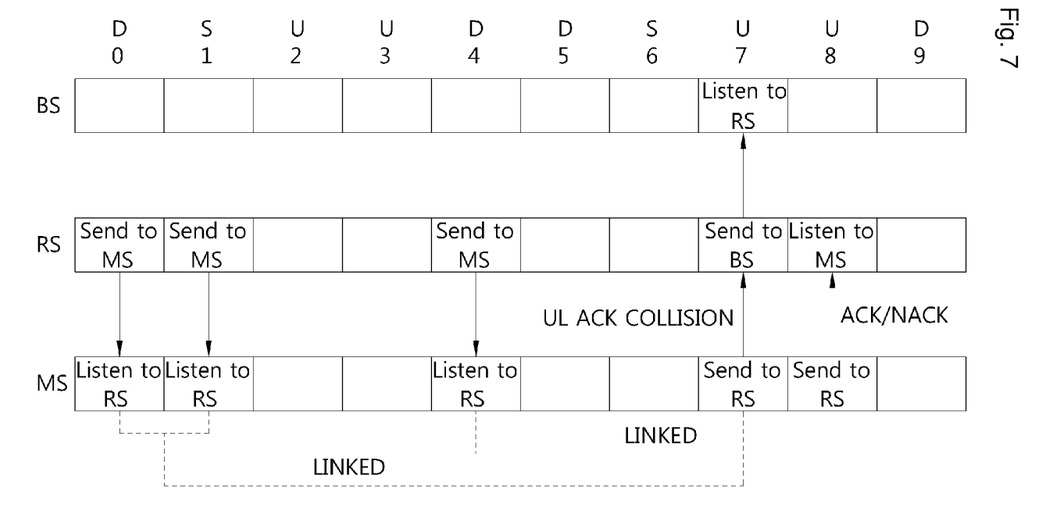
FIG. 7 shows occurrence of uplink ACK collision in a configuration 1.

FIG. 7 shows occurrence of UL ACK collision in the configuration 1 of Table 1 above. An RS transmits data to a BS in a subframe 7 which is a UL subframe. Meanwhile, an MS transmits ACK/NACK for DL data received in subframes 0 and 1 which are DL subframes to the RS in the subframe 7, and thus the UL ACK collision occurs.

Figure 8:
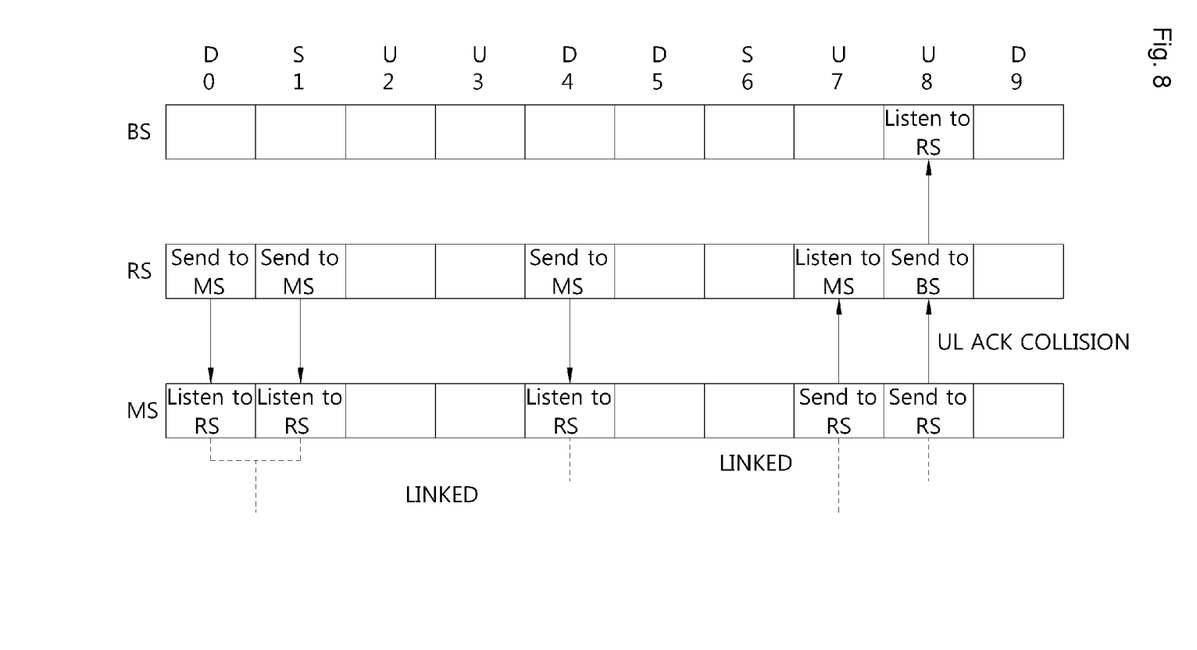
FIG. 8 shows a scenario in which a relay station and a base station transmit data by using a subframe which belongs to an uplink subframe and to which a smallest number of downlink subframes are linked according to an embodiment of the present invention.

FIG. 8 shows a scenario in which an RS and a BS transmit data by using a subframe which belongs to a UL subframe and to which the smallest number of DL subframes are linked according to an embodiment of the present invention. According to Table 2 above, the RS transmits a signal to the BS in a subframe 8 to which the smallest number of DL subframes are linked, and thus the number of DL subframes in which the UL ACK collision occurs is decreased by 1 in comparison with the scenario of FIG. 7.

Such a relay method can be used when all UL subframes are linked UL subframes as shown in the configurations 1 to 6 in Table 2 above. For example, in case of the configuration 1 of Table 2 above, the UL subframe 2 is linked to the subframes 5 and 6 which are DL subframes, and the UL subframe 7 is linked to subframes 0 and 1 which are DL subframes. In addition, the UL subframe 3 is linked to the subframe 9, and the UL subframe 8 is linked to the subframe 4. Therefore, according to the present invention, the BS and the RS can transmit data by using the subframe 3 or 8 to which one DL subframe is linked. Accordingly, the occurrence of the UL ACK collision can be alleviated.

Meanwhile, Table 3 shows a UL ACK timing index for each configuration of Table 1 above. The UL ACK timing implies a time difference between a linked UL subframe and a DL subframe liked thereto. In Table 3, '-' indicates that a subframe is configured as a UL subframe, and a numeric symbol indicates a time difference between a linked UL subframe and a DL subframe linked thereto. If the UL ACK timing is k, ACK for data received in a DL subframe n is transmitted in a UL subframe n+k. For example, ACK for data received in a DL subframe 1 of a configuration 0 is transmitted in a UL subframe 1+6=7. Table 3 is identical in practice to Table 2.

TABLE 3

| UL-DL Configu- ration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

According to another embodiment of the present invention, data can be relayed by adding a new subframe configuration in which UL ACK collision is avoided. In this case, two methods may be provided, i.e., a method of relaying data by regulating only a link relation between a UL subframe and a DL subframe while directly using the conventional configuration of Table 1 above and a method of relaying data by employing a new subframe configuration different from that of Table 1 above.

Figure 9:
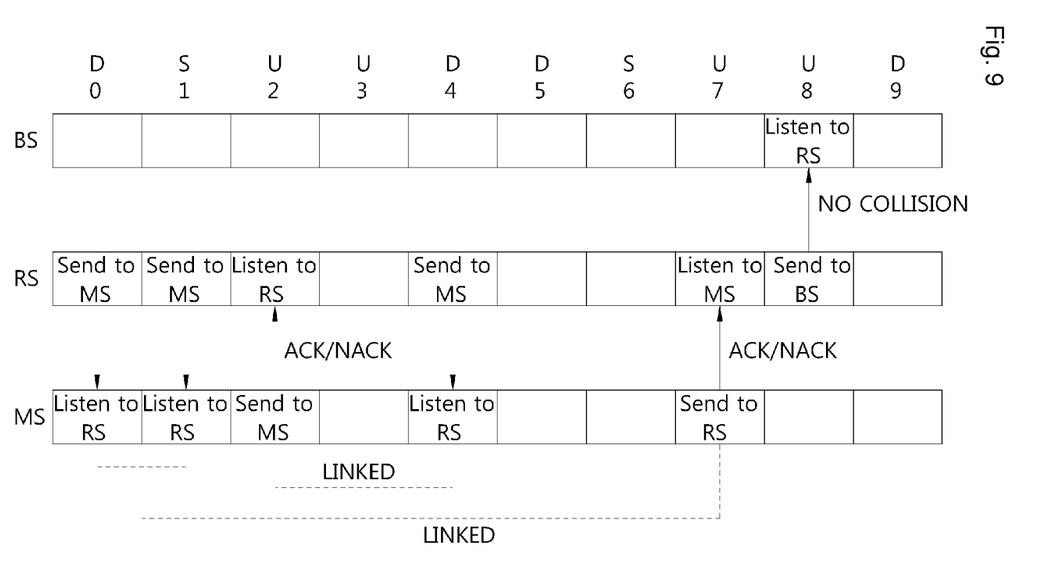
FIG. 9 shows a scenario in which a rely station and a base station transmit data by using an unlinked uplink subframe created by regulating ACK timing while directly using a configuration of a 3GPP LTE TDD system according to an embodiment of the present invention.

FIG. 9 shows a scenario in which an RS and a BS transmit data by using an unlinked UL subframe created by regulating ACK/NACK timing (i.e., ACK/NACK timing information) while directly using the UL-DL configuration of Table 1 above according to an embodiment of the present invention. Referring to Table 2 above, ACK/NACK for DL data received in a subframe 4 of the original UL-DL configuration 1 is transmitted in a UL subframe 8. According to the embodiment of the present invention, ACK/NACK timing is regulated so that ACK/NACK for DL data received in the subframe 4 is transmitted in a UL subframe 2 of a next radio frame. The regulation may be achieved by transmitting regulated ACK/NACK timing information in advance to an MS by the BS or RS. The regulated ACK/NACK timing information may be transmitted to the MS by higher-layer signal. For example, the RS may receive the regulated ACK/NACK timing information from the BS then the RS may relay to the MS. Or the RS may regulate ACK/NACK timing between the RS and the MS, then the RS transmits the regulated ACK/NACK timing information to the MS. In this process, the UL subframe 8 becomes an unlinked UL subframe, and the RS transmits data to the BS by using the subframe 8, thereby capable of avoiding UL ACK collision. In other words, by regulating ACK/NACK timing between the RS and the MS, the unlinked uplink subframe is created or the number of downlink subframe linked to an uplink subframe used as a relay subframe is reduced.

When data is transmitted by regulating the UL ACK timing as described above, a time for decoding DL data can be ensured by setting a time difference between a newly linked DL subframe and a linked UL subframe to a specific value or higher.

Table 4 shows an example of modifying a UL ACK transmission subframe index for creating unlinked UL subframes with respect to the configurations 1, 3, and 6 of Table 1 above. In Table 4, UL-DL configuration x-y indicates an $y^{th}$ modification based on a configuration x of the currently available 3GPP LTE TDD system.

TABLE 4

| UL-DL Configu- ration | subframe number | | | | | | | | | | Unlinked UL subframe |
|---|---|---|---|---|---|---|---|---|---|---|---|
| | 0 | 1 | 2 | 3 | 4 | 5 | 6 | 7 | 8 | 9 | |
| 1-1 | 7 | 7 | — | — | 2 | 2 | 2 | — | — | 3 | 8 |
| 1-2 | 7 | 7 | — | — | 8 | 2 | 2 | — | — | 7 | 3 |
| 1-3 | 7 | 7 | — | — | 2 | 2 | 2 | — | — | 7 | 3, 8 |
| 3-1 | 4 | 2 | — | — | — | 2 | 2 | 2 | 4 | 4 | 3 |
| 3-2 | 2 | 2 | — | — | — | 2 | 2 | 2 | 2 | 2 | 3, 4 |
| 3-3 | 4 | 4 | — | — | — | 4 | 4 | 4 | 4 | 4 | 2, 3 |
| 6-1 | 4 | 8 | — | — | — | 2 | 3 | — | — | 4 | 7 |
| 6-2 | 7 | 7 | — | — | — | 2 | 3 | — | — | 4 | 8 |
| 6-3 | 7 | 8 | — | — | — | 3 | 3 | — | — | 4 | 2 |
| 6-4 | 7 | 8 | — | — | — | 2 | 2 | — | — | 4 | 3 |
| 6-5 | 7 | 8 | — | — | — | 2 | 3 | — | — | 3 | 4 |
| 6-6 | 4 | 7 | — | — | — | 2 | 3 | — | — | 4 | 8 |
| 6-7 | 4 | 8 | — | — | — | 2 | 2 | — | — | 4 | 3, 7 |
| 6-8 | 4 | 8 | — | — | — | 2 | 3 | — | — | 3 | 7 |
| 6-9 | 7 | 7 | — | — | — | 2 | 2 | — | — | 4 | 3, 8 |
| 6-10 | 7 | 7 | — | — | — | 2 | 3 | — | — | 3 | 4, 8 |
| 6-11 | 7 | 8 | — | — | — | 2 | 2 | — | — | 3 | 4 |
| 6-12 | 4 | 7 | — | — | — | 2 | 2 | — | — | 4 | 3, 8 |
| 6-13 | 4 | 7 | — | — | — | 2 | 3 | — | — | 3 | 8 |
| 6-14 | 7 | 7 | — | — | — | 2 | 2 | — | — | 3 | 4, 8 |
| 6-15 | 4 | 7 | — | — | — | 2 | 2 | — | — | 3 | 6 |
| 6-16 | 7 | 7 | — | — | — | 3 | 3 | — | — | 3 | 2, 4, 8 |

Table 5 shows a UL ACK timing index corresponding to Table 4 above.

TABLE 5

| UL-DL Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 1-1 | 7 | 6 | — | — | 8 | 7 | 6 | — | — | 4 |
| 1-2 | 7 | 6 | — | — | 4 | 7 | 6 | — | — | 8 |
| 1-3 | 7 | 6 | — | — | 8 | 7 | 6 | — | — | 8 |
| 3-1 | 4 | 11 | — | — | — | 7 | 6 | 5 | 6 | 5 |
| 3-2 | 12 | 11 | — | — | — | 7 | 6 | 5 | 4 | 13 |
| 3-3 | 4 | 13 | — | — | — | 9 | 8 | 7 | 6 | 5 |
| 6-1 | 4 | 7 | — | — | — | 7 | 7 | — | — | 5 |
| 6-2 | 7 | 6 | — | — | — | 7 | 7 | — | — | 5 |
| 6-3 | 7 | 7 | — | — | — | 8 | 7 | — | — | 5 |
| 6-4 | 7 | 7 | — | — | — | 7 | 6 | — | — | 5 |
| 6-5 | 7 | 7 | — | — | — | 7 | 7 | — | — | 4 |
| 6-6 | 4 | 6 | — | — | — | 7 | 7 | — | — | 5 |
| 6-7 | 4 | 7 | — | — | — | 7 | 6 | — | — | 5 |
| 6-8 | 4 | 7 | — | — | — | 7 | 7 | — | — | 4 |
| 6-9 | 7 | 6 | — | — | — | 7 | 6 | — | — | 5 |
| 6-10 | 7 | 6 | — | — | — | 7 | 7 | — | — | 4 |
| 6-11 | 7 | 7 | — | — | — | 7 | 6 | — | — | 4 |
| 6-12 | 4 | 6 | — | — | — | 7 | 6 | — | — | 5 |
| 6-13 | 4 | 6 | — | — | — | 7 | 7 | — | — | 4 |
| 6-14 | 7 | 6 | — | — | — | 7 | 6 | — | — | 4 |
| 6-15 | 4 | 6 | — | — | — | 7 | 6 | — | — | 4 |
| 6-16 | 7 | 6 | — | — | — | 8 | 7 | — | — | 4 |

Hereinafter, a method of defining a new subframe configuration different from the configuration of Table 2 above will be taken into consideration.

To maintain compatibility with the 3GPP LTE system, subframes 0, 1, 5, and 6 need to be configured as DL subframes or special subframes. In addition, the subframes 0 and 5 are always configured as DL subframes. This is because an important control signal such as a synchronization signal is transmitted in a corresponding subframe. In addition, a special subframe is followed by a UL subframe. If a DL subframe is followed by a UL subframe, a special subframe needs to be inserted between them.

In a case where the subframe 1 is configured as a special subframe, if the subframe 6 is a DL subframe, the subframes 7, 8, and 9 all have to be DL subframes. Thus, a new configuration cannot be created except for the configurations 3, 4, and 5 in Table 1. Therefore, if the subframe 6 is configured as a special subframe, the subframes 2 and 7 are configured as UL subframes, and their configurations are determined according to the configurations of the subframes 3, 4, 8, and 9.

Table 6 shows configurations determined by the configurations of the subframes 3, 4, 8, and 9. In Table 6, some of the configurations are first configurations included in the standard configuration of Table 1 above. Some other configurations are second configurations that cannot be used since a DL subframe is immediately followed by a UL subframe. Some other configurations are third configurations obtained by shifting the second configurations, and in this case, there is no need to additionally create a new configuration. Except for such a case, candidates 1 and 3 in Table 6 are configurations that can be newly defined.

TABLE 6

| 0 | 1 | 2 | 3 | 4 | 5 | 6 | 7 | 8 | 9 | Remark |
|---|---|---|---|---|---|---|---|---|---|---|
| D | S | U | U | U | D | S | U | U | U | Configuration 0 |
| D | S | U | U | U | D | S | U | U | D | Configuration 6 |
| D | S | U | U | U | D | S | U | D | U | Unavailable |
| D | S | U | U | D | D | S | U | D | D | candidate 1 |
| D | S | U | U | D | D | S | U | U | U | candidate 2 (symmetric to configuration 6) |
| D | S | U | U | D | D | S | U | U | D | Configuration 1 |
| D | S | U | U | D | D | S | U | D | U | Unavailable |
| D | S | U | U | D | D | S | U | D | D | candidate 3 |
| D | S | U | D | U | D | S | U | U | U | Unavailable |
| D | S | U | D | U | D | S | U | U | D | Unavailable |
| D | S | U | D | U | D | S | U | D | U | Unavailable |
| D | S | U | D | U | D | S | U | D | D | Unavailable |
| D | S | U | D | D | D | S | U | U | U | candidate 4 (symmetric to candidate 1) |
| D | S | U | D | D | D | S | U | U | D | candidate 5 (symmetric to candidate 3) |
| D | S | U | D | D | D | S | U | D | U | Unavailable |
| D | S | U | D | D | D | S | U | D | D | Configuration 2 |

Table 7 shows an example of a link relation between a UL subframe and a DL subframe with respect to the candidates 1 and 3 newly defined in Table 6 above. In Table 7, '-' indicates that a subframe is configured as a UL subframe, and a numeric symbol indicates a subframe number of a UL subframe linked to a corresponding subframe. The BS and the RS can transmit data by using an unlinked UL subframe. In this case, UL ACK collision can be avoided.

TABLE 7

| UL-DL Configuration | subframe number | | | | | | | | | | Unlinked UL subframe |
|---|---|---|---|---|---|---|---|---|---|---|---|
| | 0 | 1 | 2 | 3 | 4 | 5 | 6 | 7 | 8 | 9 | |
| candidate 1-0 | 4 | 7 | — | — | — | 2 | 2 | — | 3 | 4 | None |
| candidate 1-1 | 4 | 2 | — | — | — | 2 | 2 | — | 3 | 4 | 7 |
| candidate 1-2 | 4 | 7 | — | — | — | 2 | 2 | — | 2 | 4 | 3 |
| candidate 1-3 | 7 | 7 | — | — | — | 2 | 2 | — | 3 | 3 | 4 |
| candidate 1-4 | 4 | 2 | — | — | — | 2 | 2 | — | 4 | 4 | 3, 7 |
| candidate 1-5 | 7 | 7 | — | — | — | 3 | 3 | — | 3 | 3 | 2, 4 |
| candidate 1-6 | 7 | 7 | — | — | — | 2 | 2 | — | 2 | 7 | 3, 4 |
| candidate 3-0 | 7 | 7 | — | — | 2 | 2 | 2 | — | 3 | 3 | None |
| candidate 3-1 | 7 | 7 | — | — | 2 | 2 | 2 | — | 2 | 7 | 3 |
| candidate 3-2 | 7 | 7 | — | — | 7 | 7 | 7 | — | 7 | 7 | 2, 3 |
| candidate 3-3 | 2 | 2 | — | — | 2 | 2 | 2 | — | 2 | 2 | 3, 7 |

Table 8 shows a UL ACK timing index corresponding to Table 7 above.

TABLE 8

| UL-DL Configuration | subframe number | | | | | | | | | |
|---|---|---|---|---|---|---|---|---|---|---|
| | 0 | 1 | 2 | 3 | 4 | 5 | 6 | 7 | 8 | 9 |
| candidate 1-0 | 4 | 6 | — | — | — | 7 | 6 | — | 5 | 5 |
| candidate 1-1 | 4 | 11 | — | — | — | 7 | 7 | — | 5 | 5 |
| candidate 1-2 | 4 | 6 | — | — | — | 7 | 7 | — | 4 | 5 |
| candidate 1-3 | 7 | 6 | — | — | — | 7 | 7 | — | 5 | 4 |

TABLE 8-continued

| UL-DL Configuration | subframe number | | | | | | | | | |
|---|---|---|---|---|---|---|---|---|---|---|
| | 0 | 1 | 2 | 3 | 4 | 5 | 6 | 7 | 8 | 9 |
| candidate 1-4 | 4 | 11 | — | — | — | 7 | 7 | — | 6 | 5 |
| candidate 1-5 | 7 | 6 | — | — | — | 8 | 7 | — | 5 | 4 |
| candidate 1-6 | 7 | 6 | — | — | — | 7 | 7 | — | 5 | 8 |
| candidate 3-0 | 7 | 6 | — | — | 8 | 7 | 6 | — | 5 | 4 |
| candidate 3-1 | 7 | 6 | — | — | 8 | 7 | 6 | — | 4 | 8 |
| candidate 3-2 | 7 | 6 | — | — | 13 | 12 | 11 | — | 9 | 8 |
| candidate 3-3 | 12 | 11 | — | — | 8 | 7 | 6 | — | 4 | 13 |

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of relaying data by a relay station in a wireless communication system based on time division duplex (TDD) using a radio frame comprising a plurality of downlink subframes and a plurality of uplink subframes, the method comprising:
    transmitting downlink data to a mobile station (MS) at a downlink subframe;
    determining whether a first uplink subframe, to be used for transmitting uplink data to a base station (BS), is a linked uplink subframe, wherein the linked uplink subframe is an uplink subframe that is reserved to receive an acknowledgement/non-acknowledgement (ACK/NACK) for the downlink data from the MS;
    changing an uplink subframe, to be used for receiving the ACK/NACK for the downlink data from the MS, from a first uplink subframe to a second uplink subframe when the first uplink subframe is the linked uplink subframe;
    transmitting the uplink data to the BS at the first uplink subframe; and
    receiving the ACK/NACK for the downlink data at the second uplink subframe when the first uplink subframe is the linked uplink subframe,
    wherein the second uplink subframe is an uplink subframe that is positioned next to the first uplink subframe.

2. The method of claim 1, wherein the radio frame consists of 10 subframes.

3. The method of claim 2, wherein the radio frame has at least one uplink-downlink (UL-DL) configuration shown in the following table:

| UL-DL Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where 'D' denotes a downlink subframe, 'U' denotes an uplink subframe, and 'S' denotes a special subframe.

4. The method of claim 1, further comprising:
    transmitting ACK/NACK timing information to the MS,
    wherein the ACK/NACK timing information indicates the second uplink subframe.

* * * * *